(12) United States Patent
Trishaun et al.

(10) Patent No.: US 10,408,489 B1
(45) Date of Patent: Sep. 10, 2019

(54) SMART SYSTEM MONITOR AND METHOD

(71) Applicant: Marquette Trishaun, Orlando, FL (US)

(72) Inventors: Marquette Trishaun, Orlando, FL (US); Laron Walker, Sandy Springs, GA (US); Joseph Corteo, Orlando, FL (US); Andre Clarke, Apopka, FL (US)

(73) Assignee: Marquette Trishaun, Orlando, FL (US)

( * ) Notice: Subject to any disclaimer, the term of this patent is extended or adjusted under 35 U.S.C. 154(b) by 0 days.

(21) Appl. No.: 16/159,509

(22) Filed: Oct. 12, 2018

Related U.S. Application Data

(63) Continuation-in-part of application No. 15/649,858, filed on Jul. 14, 2017, now Pat. No. 10,102,492.

(60) Provisional application No. 62/363,272, filed on Jul. 17, 2016.

(51) Int. Cl.
*F24F 11/89* (2018.01)
*G01F 23/26* (2006.01)
*F24F 13/22* (2006.01)
*G01M 3/16* (2006.01)
*F24F 11/36* (2018.01)
*F24F 11/50* (2018.01)
*F24F 130/20* (2018.01)
*F24F 140/30* (2018.01)
*F24F 110/10* (2018.01)
*F24F 110/20* (2018.01)
*F24F 110/40* (2018.01)

(52) U.S. Cl.
CPC .............. *F24F 11/89* (2018.01); *F24F 11/36* (2018.01); *F24F 11/50* (2018.01); *F24F 13/222* (2013.01); *G01F 23/268* (2013.01); *G01M 3/16* (2013.01); *F24F 2110/10* (2018.01); *F24F 2110/20* (2018.01); *F24F 2110/40* (2018.01); *F24F 2130/20* (2018.01); *F24F 2140/30* (2018.01)

(58) Field of Classification Search
None
See application file for complete search history.

(56) References Cited

U.S. PATENT DOCUMENTS

| | | | |
|---|---|---|---|
| 5,856,783 A | 1/1999 | Gibb | |
| 6,512,478 B1 * | 1/2003 | Chien | G01S 5/0215 340/572.1 |

(Continued)

*Primary Examiner* — Fekadeselassie Girma
(74) *Attorney, Agent, or Firm* — Brian S. Steinberger; Hilary F. Steinberger; Law Offices of Brian S. Steinberger, P.A.

(57) ABSTRACT

Systems, devices, and methods for smart sensors/monitors and for a smart asset tag solution for tracking assets along the distribution cycle. These solutions are an extension of using various radio frequency technologies to locate the whereabouts of goods/assets with the use of additional sensors to provide granular knowledge about the asset above and beyond location. The technology can differentiate when the asset is being transported, stationary, or other inspection points along the distribution cycle of the cargo. Other applications of smart sensors, monitors, systems, devices and methods can be used to monitor fluid-leak detection or fluid-level detection from an electro-mechanical device, such as water pump, as well as fluid/water such as from a water pump, and for measuring and monitoring condensation levels in a pan under an HVAC system, and the like.

16 Claims, 12 Drawing Sheets

(56) References Cited

U.S. PATENT DOCUMENTS

| | | | | |
|---|---|---|---|---|
| 6,553,336 B1* | 4/2003 | Johnson | G01D 3/022 | 702/188 |
| 7,133,800 B2* | 11/2006 | Delin | G01D 21/00 | 702/125 |
| 7,945,776 B1* | 5/2011 | Atzmony | G06F 21/31 | 713/164 |
| 9,392,417 B1* | 7/2016 | Venkatraman | H04B 1/385 | |
| 9,823,156 B1* | 11/2017 | Jerphagnon | G01M 3/04 | |
| 10,102,492 B1 | 10/2018 | Trishaun | | |
| 10,169,771 B1* | 1/2019 | Devereaux | G06Q 30/0215 | |
| 2006/0019694 A1* | 1/2006 | Sutivong | H04W 52/24 | 455/522 |
| 2007/0043478 A1* | 2/2007 | Ehlers | F24F 11/30 | 700/276 |
| 2008/0158391 A1* | 7/2008 | Suzuki | H04N 5/772 | 348/231.99 |
| 2008/0201544 A1* | 8/2008 | Nakajima | G06F 3/061 | 711/166 |
| 2010/0313748 A1 | 12/2010 | Schluter | | |
| 2012/0112536 A1* | 5/2012 | Karalis | H02J 50/12 | 307/10.1 |
| 2012/0161958 A1* | 6/2012 | Turon | G01S 19/34 | 340/539.3 |
| 2012/0223573 A1* | 9/2012 | Schatz | H02J 5/005 | 307/9.1 |
| 2012/0235501 A1* | 9/2012 | Kesler | H03H 7/40 | 307/104 |
| 2012/0235634 A1* | 9/2012 | Hall | H03H 7/40 | 320/108 |
| 2014/0351295 A1* | 11/2014 | Doi | G08G 1/0112 | 707/812 |
| 2015/0054413 A1* | 2/2015 | Chen | H05B 37/0281 | 315/155 |
| 2015/0213709 A1* | 7/2015 | Miller | H02J 7/35 | 340/693.2 |
| 2015/0236546 A1* | 8/2015 | Kesler | H04B 5/0037 | 455/573 |
| 2015/0255994 A1* | 9/2015 | Kesler | H02J 5/005 | 307/10.1 |
| 2015/0371511 A1* | 12/2015 | Miller | G01S 19/16 | 340/545.6 |
| 2015/0373487 A1* | 12/2015 | Miller | G06Q 10/0833 | 455/456.1 |
| 2015/0376874 A1* | 12/2015 | Breedlove | E03B 7/071 | 137/2 |
| 2016/0104250 A1* | 4/2016 | Allen | G06Q 40/08 | 705/50 |
| 2016/0132099 A1* | 5/2016 | Grabau | G06K 9/00771 | 713/323 |
| 2016/0153674 A1* | 6/2016 | Lancaster | H04Q 9/00 | 700/276 |
| 2016/0234034 A1* | 8/2016 | Mahar | H04L 12/282 | |
| 2016/0265208 A1* | 9/2016 | Brackett, Sr. | E03D 11/00 | |
| 2017/0108233 A1* | 4/2017 | Howard | F24S 20/50 | |
| 2017/0245347 A1* | 8/2017 | Zhou | H05B 37/0227 | |
| 2017/0254555 A1* | 9/2017 | Tae | G05B 19/048 | |
| 2017/0269220 A1* | 9/2017 | Turon | G01S 19/34 | |
| 2017/0345270 A1* | 11/2017 | Singh | G08B 21/02 | |
| 2018/0357688 A1* | 12/2018 | Webb | G06Q 10/04 | |

\* cited by examiner

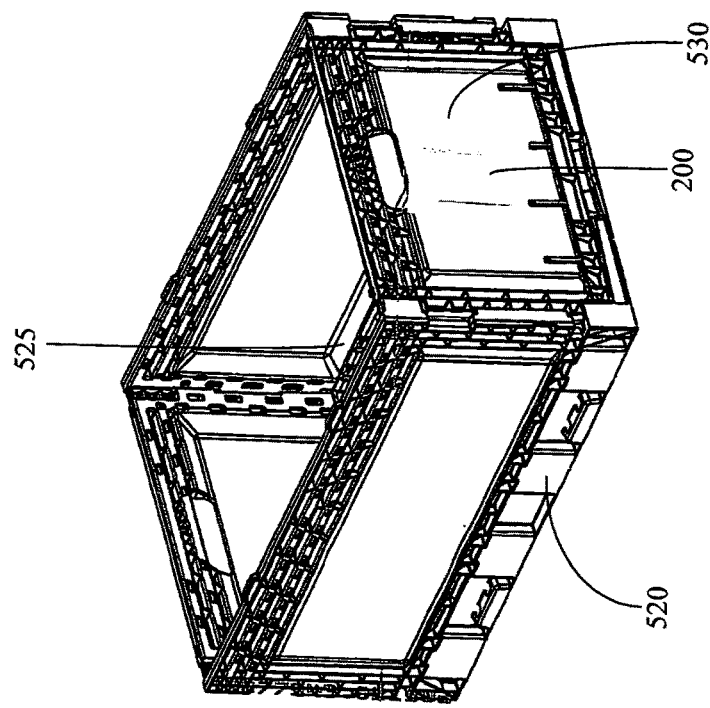
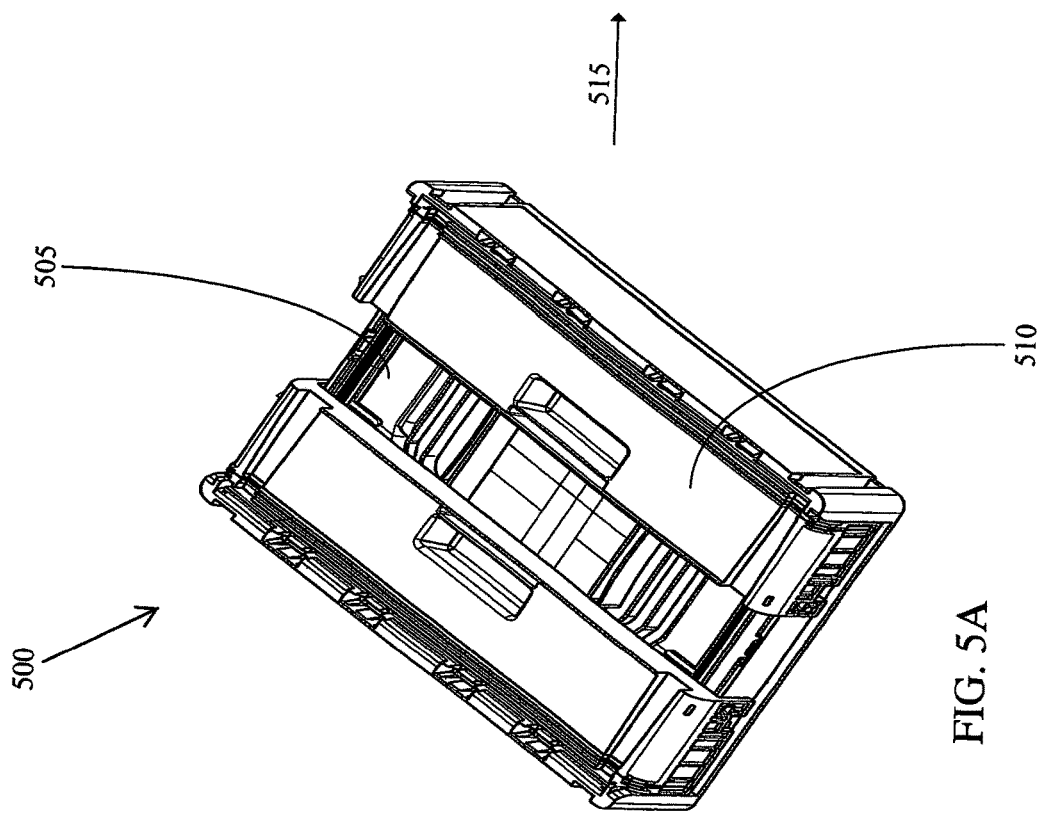
FIG. 5A
FIG. 5B

SMART SYSTEM MONITOR AND METHOD

CROSS REFERENCE TO RELATED APPLICATIONS

This application is a Continuation-In-Part of U.S. patent application Ser. No. 15/649,858 filed Jul. 14, 2017, now U.S. patent Ser. No. 10/102,492 issued Oct. 16, 2018, which claims the benefit of priority to U.S. Provisional Application Ser. No. 62/363,272 filed Jul. 17, 2016. The entire disclosure of each of the applications listed in this paragraph are incorporated herein by specific reference thereto.

FIELD OF INVENTION

This invention relates to smart sensors, and smart monitors, and in particular to devices, systems for the tracking of assets using tags, and the like, along a supply chain logistics transport cycle which extends the use of radio frequency technologies to locate the whereabouts of goods/assets, with the use of additional sensors to provide granular knowledge about the asset above and beyond location, and to sensors, devices, systems and methods that can monitor fluid-leak detection or fluid-level detection from an electro-mechanical device, such as water pump, as well as fluid/water such as from a water pump, and for measuring and monitoring condensation levels in a pan under an HVAC system, and the like.

BACKGROUND AND PRIOR ART

Almost without exception, most active tags monitor overall movement using a GPS assisted radios with no priori to energy conservation when the tag is indoors or other stationary situations where the tag is not currently deployed with assets in tow. While passive tags are not susceptible to the constant energy draw, they are not capable of maintaining active records of the events for the duration of the whole trip due to limitations of energy that can be stored on the tag. This limits their effectiveness where real-time alerts are desired.

Accordingly, there is a need for an asset tag that can conserve energy when not in use like the inherent nature of the passive RFID tag but when active provide the ability for real-time retrieval of actionable data where assets are being tracked during the transport cycle where a number of environmental conditions can adversely alter or affect the items while in tow.

HVAC (heating, ventilation and air conditioning) systems and other types of electro mechanical devices such as water pumps can have fluid/water leakage problems or other fluid related problems that are not readily detected. For example, a typical HVAC system can have a condensation drip tray that can fill up, and if not inspected can cause water to backup and overflow. As such, a service technician may not be contacted until it is too late to stop overflowing water damage from occurring.

Thus, the need exists for solutions to the above problems with the prior art.

SUMMARY OF THE INVENTION

A primary objective of the invention is to provide an active asset tag with multiple input sensors to provide the tag a sense of situational awareness to switch context from storing, transmitting, and conserving energy in the proper context for prolonged deployment in the supply chain.

The sensor can be designed in such a fashion to allow for multiple embodiments where the sensor can be attached as standalone to a single end item (i.e. sensitive luggage) or concealed within the framework of cargo, containers, and other supply transport mechanisms.

This sensor shall contain a proximity sensor with the addition of an inertial measurement unit/displacement sensor to detect if something is approaching or moving away from the tracked asset. Said sensor can also be used to assert regulatory processes with how fast and how much impact a tracked asset can withstand during mounting and dismounting during any transport.

This sensor includes multiple radio protocols in different radio bands for broadcasting a distress beacon tuned within the bandwidth of first responder's radios to alert the said responder to the distressed asset within their sphere of patrol/coverage. WI-FI is an example of a modern radio protocol that can provide information about whereabouts using MAC address if the missing asset is within the range of a broadcasting WI-FI LAN from a home, or business nearby.

This sensor can include an RF transponder to assist with person assisted location efforts where the partnered responder shall have a custom designed homing device capable of remote control access for collocation on a UAV type system for broad scans of a remote area. The said mode is also intended to provide a means to locate the distressed assets when all other onboard energy sources are completely discharged.

The electronic card assembly shall comprise both the circuit card, and a hybrid battery solution that relies on both a solid state battery and energy-harvesting style mechanisms to maintain the minimal operation point of the sensor. An example of such technology is the kinetic motion used to power wrist watches. The sensor shall contain a high energy cell that shall be activated via electro mechanical switch, and is intended as one-time high-energy-density power source (i.e. lithium battery) for the transmit tower level broadcasting of the distress beacon when the sensors normal battery is at a critical level.

The sensor will charge by air on a day-to-day basis during normal operation without requiring removal of the battery supply. The sensor shall also contain provisions for solar cell operation where exposure to sunlight is available per the specified embodiment.

The sensor software suite running on the host mobile device/personal computer shall pinpoint the exact location of the tracked asset using a leading mapping application (i.e. Google Maps etc.). The sensor data shall be reported to the cloud for predicative analytics on a granular level about the overall health and anticipation of the protected asset.

The wireless link shall support the Bluetooth, UHF/VHF and LTE communication protocol. The chosen antenna and RF substrate are fully compatible with all competing lower-power standards/communication radios.

The sensor can be designed/packaged in such a way to conceal its presence on a tracked asset. The sensor shall be capable of being concealed within the individual packaging, on the shipping container, or mechanical transport mechanisms.

Another objective of the subject invention is to provide smart monitoring sensors, devices, systems and methods that can monitor fluid-leak detection or fluid-level detection from an electro-mechanical device, such as water pump, as well as fluid/water such as from a water pump, and for measuring and monitoring condensation levels in a pan under an HVAC system, and the like.

A climate monitor assembly can have a separate circuit card that can be mounted elsewhere within the HVAC system to monitor various ambient parameters (i.e. relative humidity, barometric pressure, ambient light, etc.) via its on-board suite of sensors. The climate monitor assembly can also have a digital port to interface with optional daughter circuit boards, such as a water leak detection probe, further expanding its default capabilities.

The climate monitor assembly can also have an on-board IMU, enabling "tap-to-wake" and spatial orientation awareness capabilities. The climate monitor can also be equipped with an MCU with built-in radio to allow for remote data collection and monitoring via a wireless link. This assembly can also can run on a separate coin cell battery, and the circuit board comes equipped with circuitry for power regulation.

The wireless link between a central router hub assembly, and climate monitor assembly can support the Bluetooth, UHF/VHF and LTE communication protocol. The chosen antenna and RF substrate can be fully compatible with all competing lower-power standards/communication radios.

A central router hub can serve as a transparent bridge between the devices residing on the Bluetooth Low Energy (BLE) network (i.e. climate monitor assemblies) and the cloud services residing on the internet. To accomplish this, the central router can be equipped with two separate Radio-Frequency (RF) integrated circuits (IC). The main MCU, can be equipped with a built-in BLE radio and is responsible for scanning and collecting data from all climate monitor assemblies within its vicinity. This collected data is then passed to the second, onboard RF IC which has the capability of interfacing with the internet, and therefore the cloud, via a cellular or Wi-Fi connection. Therefore, one central router hub has the ability to provide complete coverage to a HVAC system equipped with multiple climate monitor assemblies.

A sensor software suite running on the host mobile device/personal computer and/or cloud service will serve as the interface in which the end-user can view, collect, share, and operate on the data being reported wirelessly by the deployed central router hub assemblies, which in turn are collecting and aggregating data from climate monitor assemblies within its proximity. Through the implementation of cloud computing/analytic software, technicians can then be dispatched autonomously to HVAC systems having sensors that require replacement/refurbishment or when the associated coin cell battery requires replacement, and also for servicing the HVAC systems as needed.

Further objects and advantages of this invention will be apparent from the following detailed description of the presently preferred embodiments which are illustrated schematically in the accompanying drawings.

BRIEF DESCRIPTION OF THE FIGURES

The drawing figures depict one or more implementations in accord with the present concepts, by way of example only, not by way of limitations. In the figures, like reference numerals refer to the same or similar elements.

FIG. 5A is a perspective view of the sensor of the preceding figures in a collapsible container that is in a collapsed state.

FIG. 5B is a perspective view of the sensor in the container of FIG. 5A in an assembled state.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

Figure 1B:
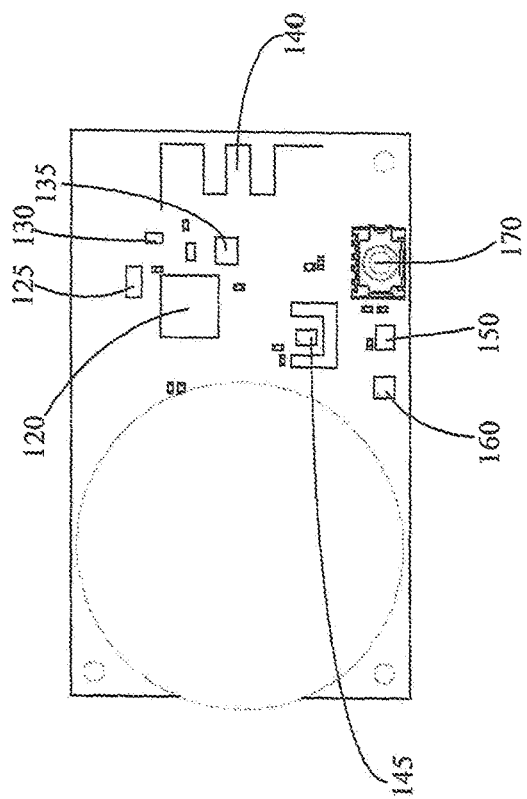
FIG. 1B is a front view of the sensor circuit architecture of FIG. 1A.
Figure 1A:
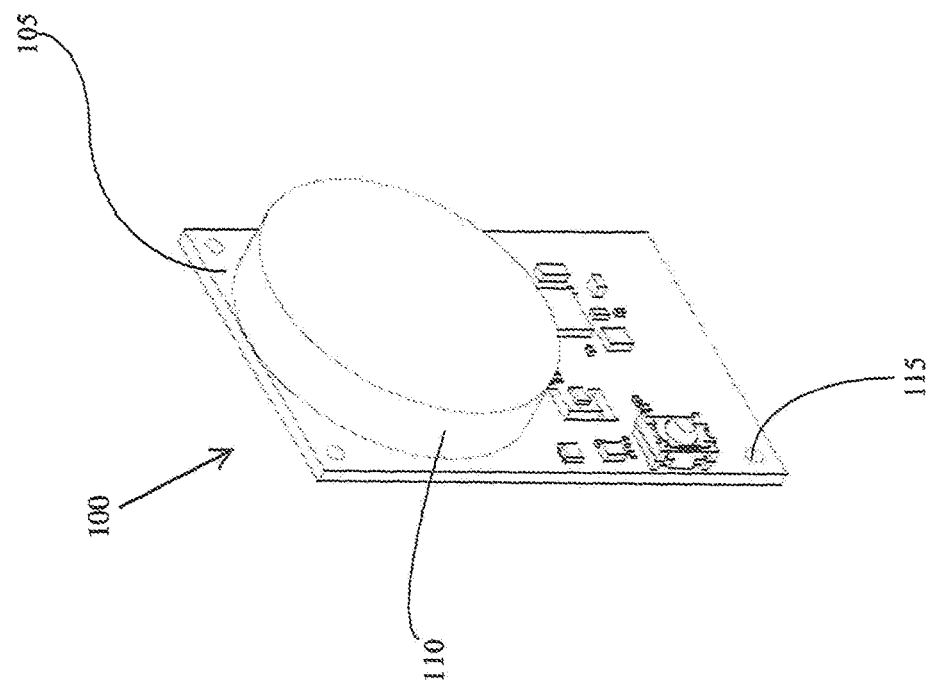
FIG. 1A is a perspective front view of sensor circuit architecture used in the sensor.

FIGS. 1A-1B shows an overview of a first embodiment sensor circuit architecture 100. In the embodiment shown in this figure, the printed wiring board 105 makes provision for the battery source 110 to be directly coupled to the board to allow for a self-contained solution that is easy to replace the battery. The mounting holes 115 allow for the sensor to take on multiple embodiments where it is desired to conceal within containers and other external enclosures as a sub-assembly.

At the heart of the sensor can be a microprocessor 120 that is responsible for maintaining all housekeeping functions to include monitoring battery voltage, low power radio alerts, along with storing off the snapshots from periphery sensors. The lower power radio systems make use of compact and planar antennae 140 embedded into the printed circuit board.

The periphery sensor can include but is not limited to the inertial measurement unit 160 for measuring vibrations and any other motion associated with the sensor. The onboard humidity/temperature sensor 145 measures relative humidity up to a full scale value of 100%. The onboard ambient/UV light sensors 150 allow for the sensor to distinguish between indoor lighting versus outdoor sunlight.

This function is useful in not running the GPS radio 135 when the sensor is indoors to conserve the large amounts of energy wasted in an attempt to obtain a futile satellite lock.

The onboard flash unit 120 allows the sensor to store off environmental data for the sensor for total recall of the events regarding the asset during transport. The said sensor also stores off local extremes for the tracking of assets sensitive to environmental changes which can detect if a fleet unit is maintaining proper refrigeration etc. Once the sensors are back at the depot, an IR receiver 170 can be sent a special code to wipe out the units' maximum/minimum sensor readings across multiple sensors simultaneously with involving the lower power radio units. This allows for selective wiping of sensors without effecting others if the end user so desires.

Figure 2B:
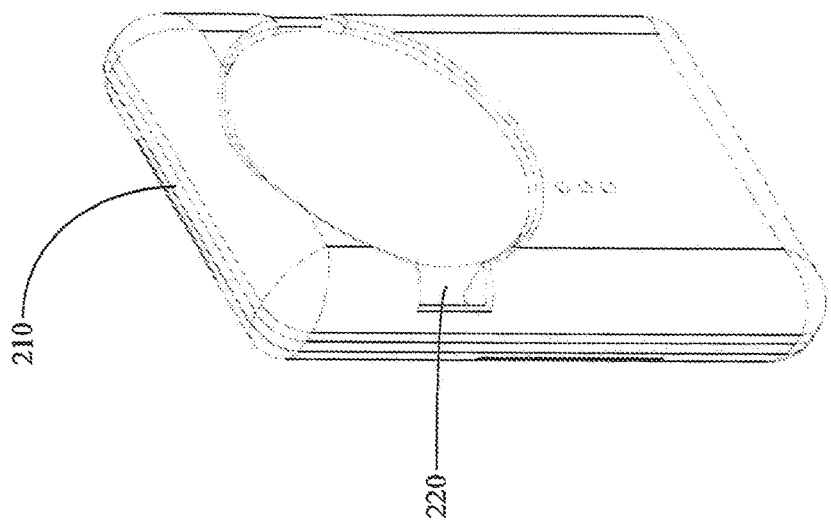
FIG. 2B is a front view of the sensor with standalone enclosure of FIG. 2A upright.
Figure 2A:
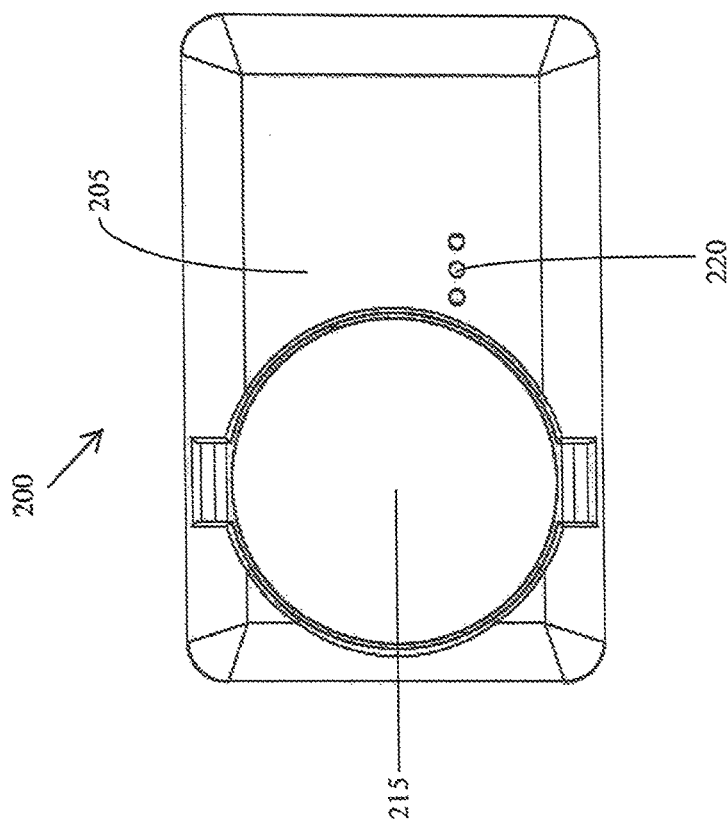
FIG. 2A is a perspective front view of the sensor with standalone enclosure.

FIGS. 2A-2B are illustrations of the tag in a standalone enclosure subassembly 200. The outer enclosure 205 forms a hermetic seal where needed with vent holes 220 that can be patched with Gortex material to allow vapor to pass and still provide accurate humidity readings. The case is streamline 210 for adhesive mounting to packages. The case provides easy access to the battery compartment 220 for quick changing of the battery 215 without dismantling the sensor.

Figure 3:
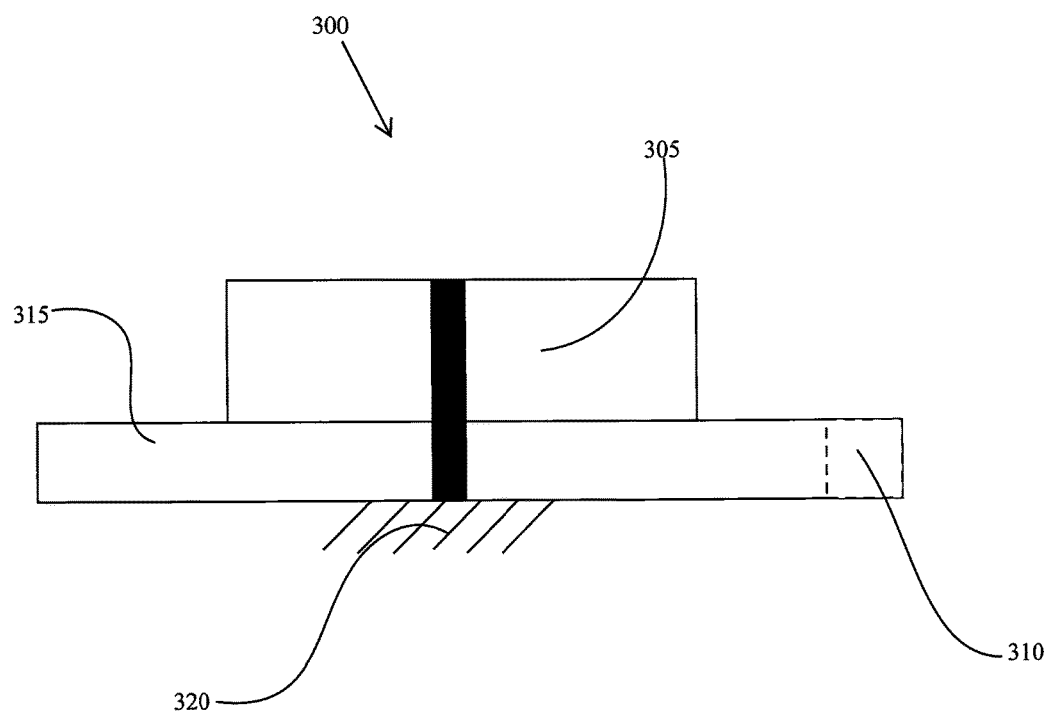
FIG. 3 shows the sensor of the preceding figures on a tracked asset.

FIG. 3 depicts the tag contained within a package 305 while being transported via a pallet. Multiple packages with tags can be picked up and read using another tag in master mode 310 concealed within the pallet. Said pallets can be stacked 320 on top of one another with no adverse effects to the other tags in close proximity.

Figure 4:
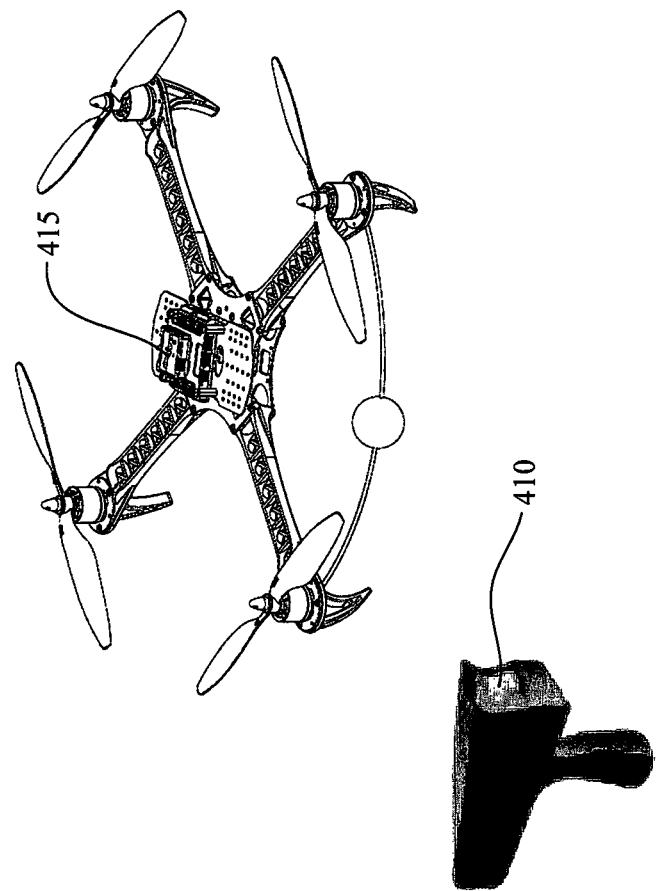
FIG. 4 is an illustration of the operation of the sensor of the preceding figures in RF-Beacon Mode
Figure 4:
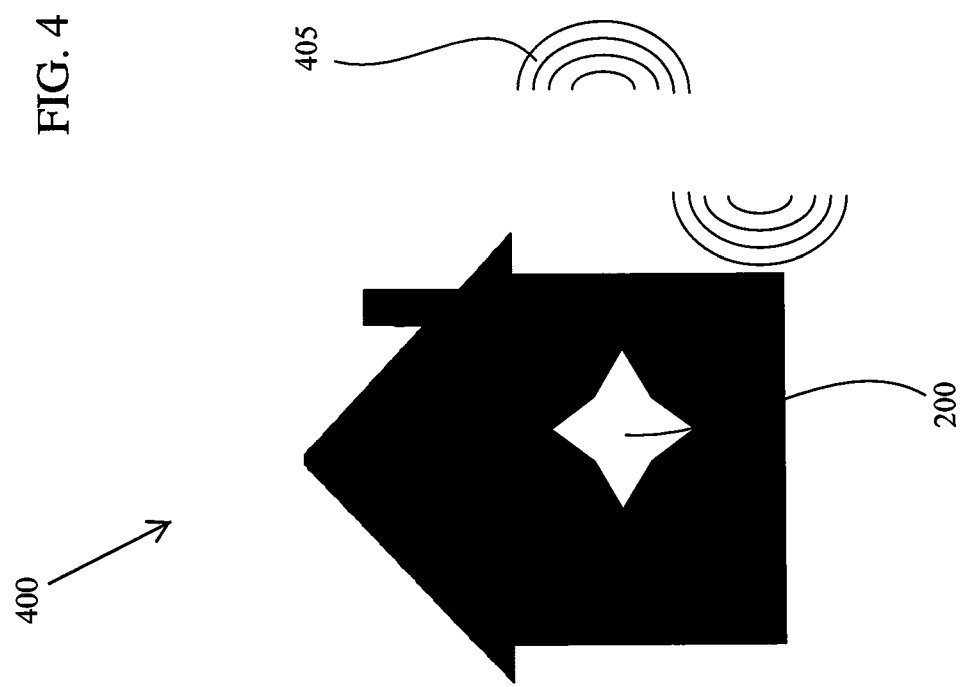

FIG. 4 covers the scenario of a lost tag on a tracked asset 400. Since the tag 200 contains and active radio it can therefore beacon at a user determined polling rate. A dedicated reader 410 can be programmed to scan for these signatures 405 to locate assets within buildings from outside the building. Such reader can be mounted to a drone unit 415 to cover large swaths of land where multi-unit warehouses come into play.

FIG. 5 is an illustration of sensor in a collapsible container. When in a collapsed state 510, algorithms detect movement and orientation 505 in order to determine if the unit is being readied for transport in upright stationary position 520. As the unit transitions from the collapsed state 515 to being ready for the transport of goods 525, this detected state change triggers various notifications and status updates to signal an appropriate course of actions. When the asset is fully expanded the sensor 200 is in a specific orientation 530 which tracks and alerts to the current state of the asset, an example being whether the asset is being used/filled with goods.

Figure 6:
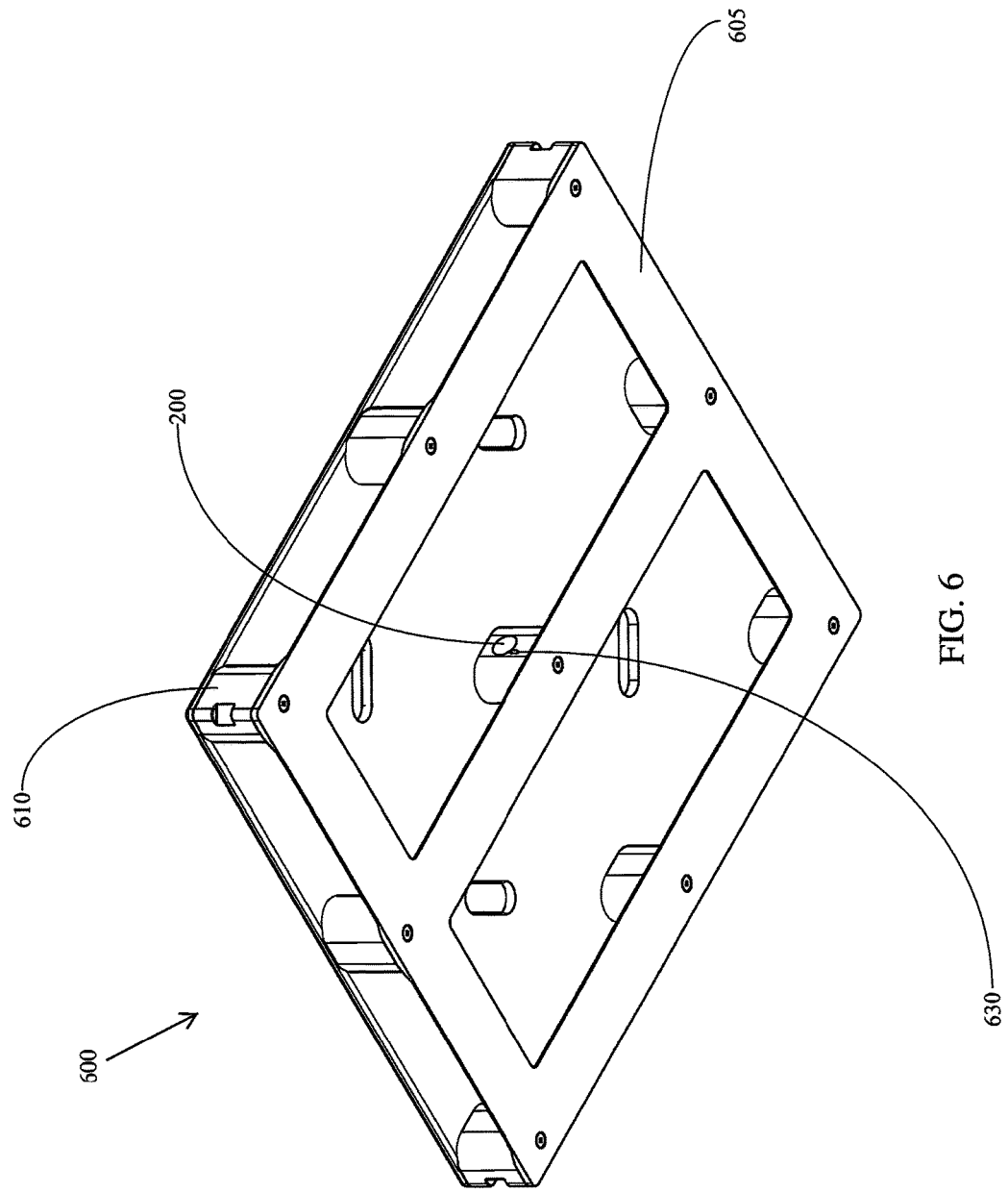
FIG. 6 is a perspective view of the sensor of the preceding figures permanently installed in a pallet.

FIG. 6 is an illustration of the sensor permanently installed in a pallet 605. Although the tag could be installed in one of the many corner blocks 610, in some cases it is desired to conceal the tag in a less conspicuous fashion and target the center block. While maintained in the center block, a simple opening 630 is needed where units are required to track humidity otherwise the tag can be permanently installed and still maintain access to the battery.

Figure 7:
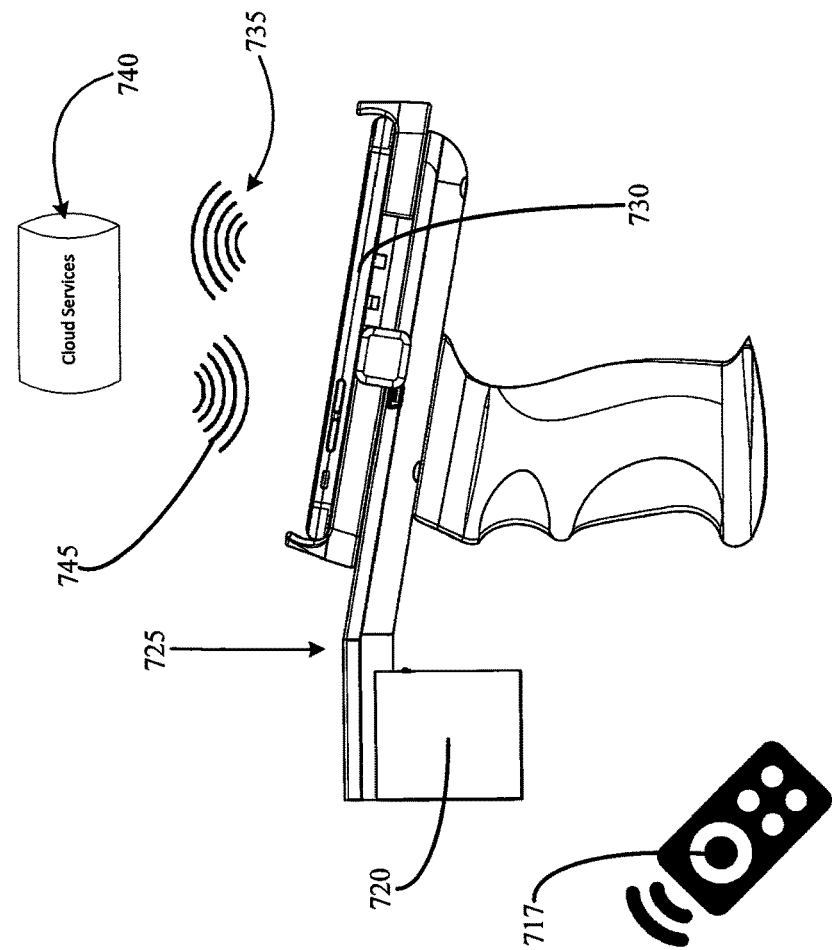
FIG. 7 is an illustration of the sensor of the preceding figures during a logistical operation.
Figure 7:
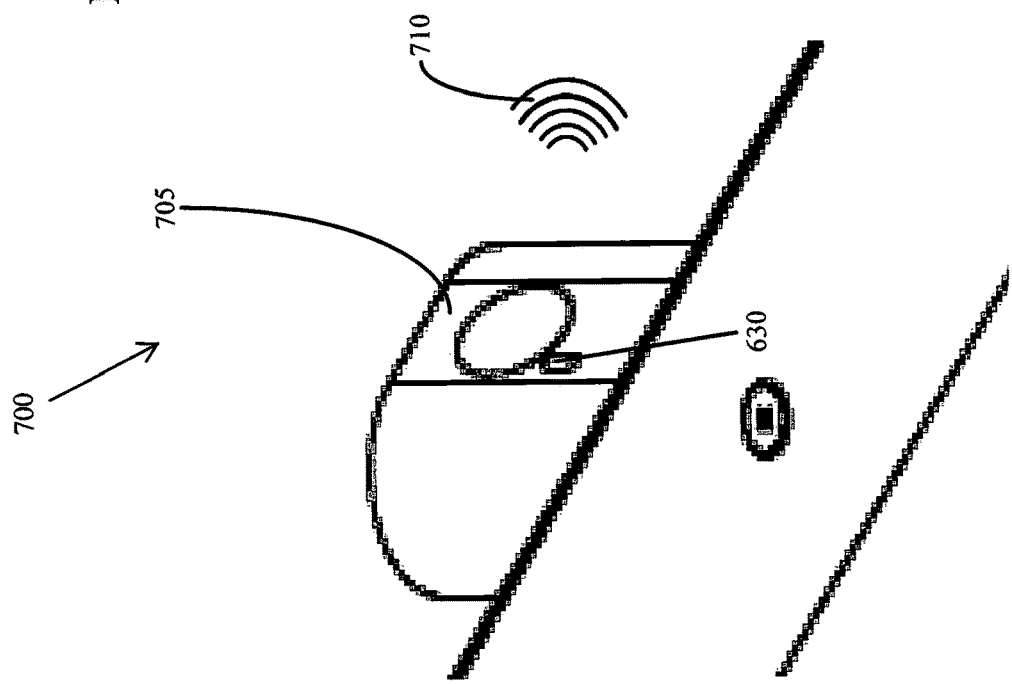

FIG. 7 is an illustration of the sensor during logistical supply chain operation. When the tag enters a warehouse facility 700 it can be immediately picked up by readers in both close and far proximity since the active RF beacon feature 710 insures approximately several meters of range. This eliminates chokepoints and missed reads attributed to passive RFID tags. The reader 720 is paired with software for configuration and data display purposes. The software is not limited to any form of operating system and can exist local or in remote proximity to the reader (i.e. laptop, tablet, smartphone) 730.

Sensor data reports are configurable in the software both as to the functionality of the reader and the data retrieved from the tags. Using a cloud database of pertinent data 740 on perishable items for example, said data parameters 745 can be passed down to local reader to corroborate with data collected by the reader from the tag 735) and passed up to this database from the tag such the end user can make real-time decisions about what is permissible norms of the assets received. When all said and done local data can be erased using an IR reader 717 with special codes authorizing such, and the tag is again ready for deployment.

Figure 8:
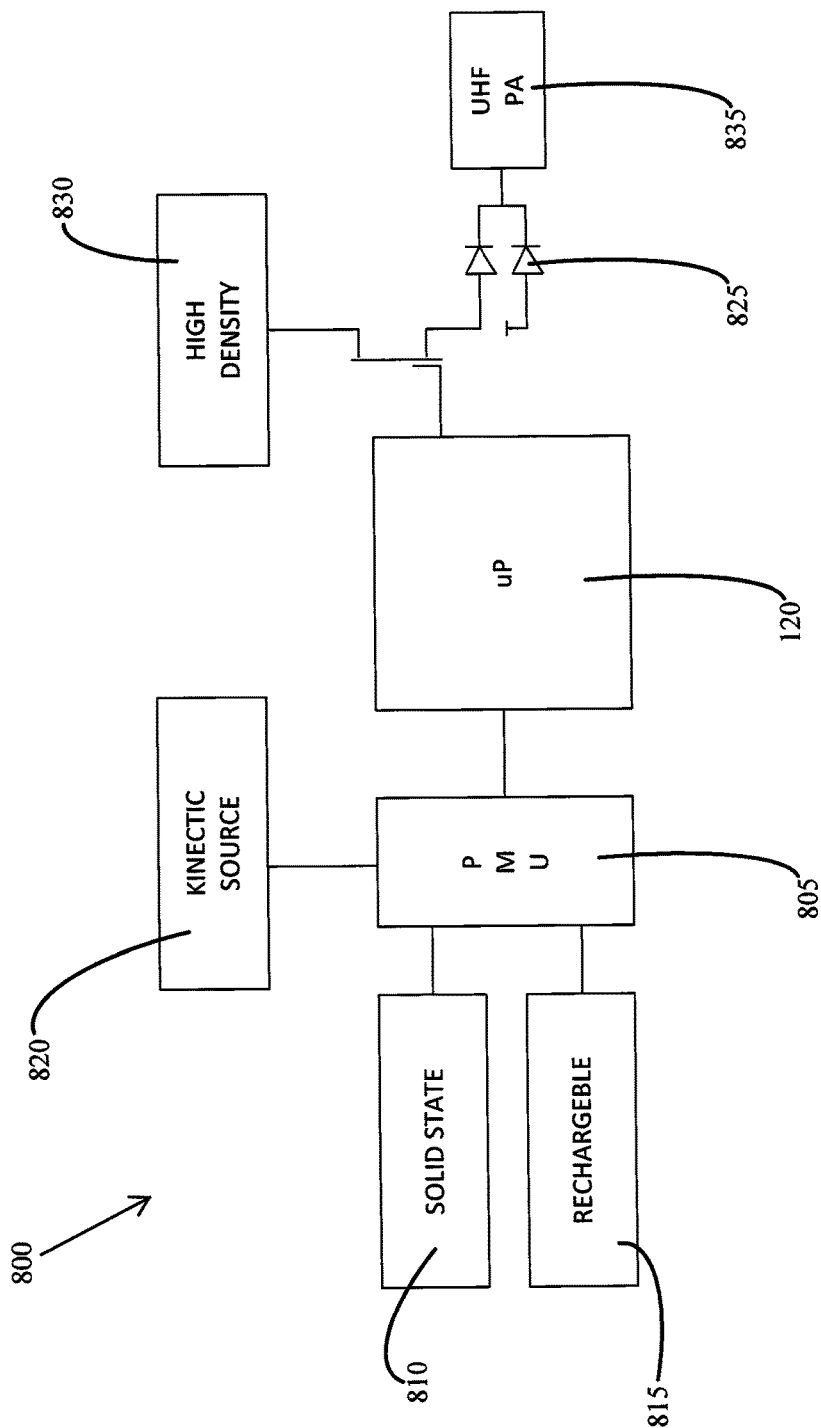
FIG. 8 depicts the hybrid power flow chart scheme for an asset in distress.

Referring to FIG. 8, the onboard power management system 800 shall utilize a hybrid power scheme intended to maximize the life of the sensor during the distress mode. During the normal day-to-day operation of the sensor, only the rechargeable battery 815 will be in use. When the RLS sensor becomes low on power during normal operation, the sensor will send periodic alerts to the host monitoring system (i.e. ADT style security personnel) using a higher powered amplifier 835 to ensure both local and wide area broadcast power distress. The solid-state battery 810 is intended for use with an energy harvesting mechanism to convert natural energy sources (i.e. thermal and solar energy) for ultra-low-rate bursts using the RFID tag in a perpetual beacon mode but can be limited by available power—however any minuet power will still result in a broadcast. Certain embodiments of the sensor will contain a high energy source 830 to broadcast very strongly at maximum power that this is will last time said sensor is alive for broadcast equivalent to burning a flare on distress ship.

Referring to FIGS. 1A, 2B, 3 and 4, the Smart tag has the provision to be leveraged as a tracking device that can report the state of a tracked asset during a transport. During operation, the tag will provide data points at every critical junction throughout the entire chain of custody.

The system will flag conditions throughout transport. During flight, the tag flags events such as tampering (i.e. opening a container), excessive shock and/or additional environmental conditions that are outside of prescribed bounds set during configuration or the microprocessor 120. At designated times, data from the tag is not only stored in persisted storage located in 740, data is also stored in a distributed blockchain ledger housed there as well. Data in the ledger will be recoverable on demand when needed (i.e. insurance claims, law suits, Proof of delivery). In certain cases, ledger entries in 740 will trigger Smart contract for payments and/or other secondary workflow actions. Data from 735 is passed to 740 over the air in and automated fashion with the necessity of human intervention. Such data is transmitted whenever the Tag 735 in in vicinity of the reader 410.

Figure 9:
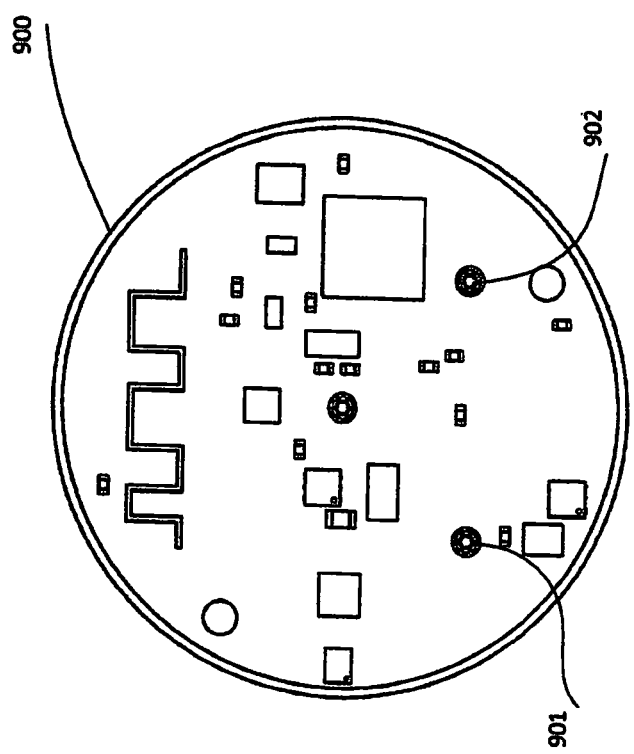
FIG. 9 is a top view of a sensor circuit architecture for fluid-leak detection.
Figure 10:
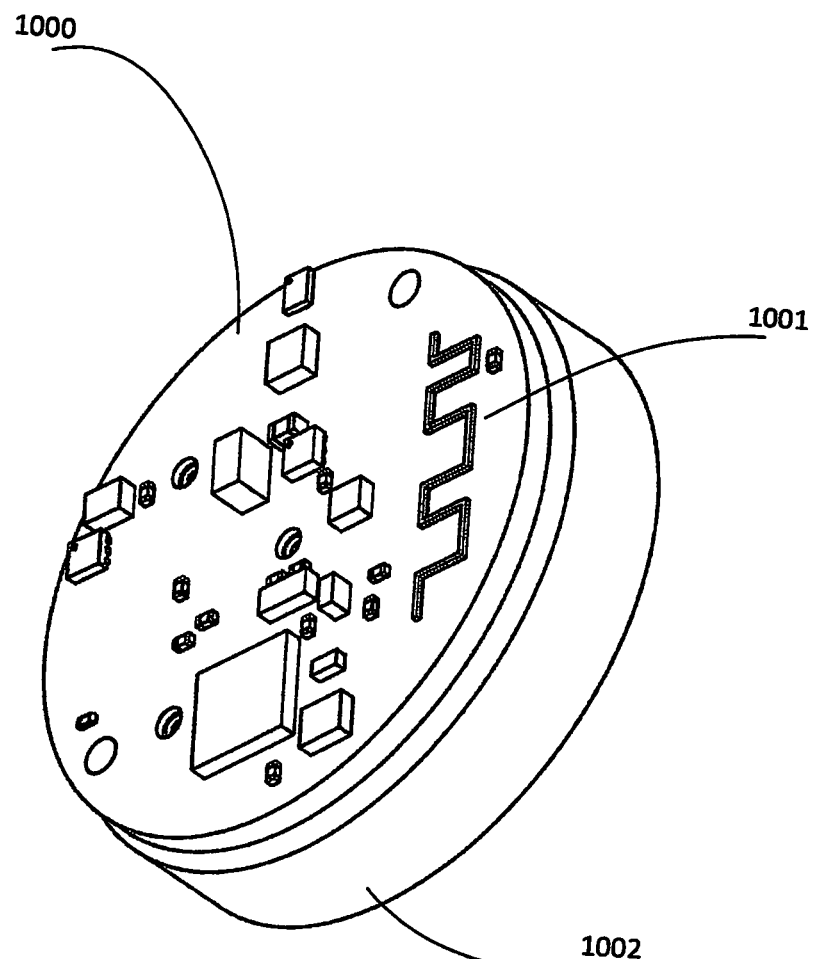
FIG. 10 is a perspective view of the fluid-leak detection sensor of FIG. 9.

FIG. 9 is a top view of another embodiment sensor circuit architecture in a sensor 900 for fluid-leak detection. FIG. 10 is a perspective view of the fluid-leak detection sensor 900 of FIG. 9.

Referring to FIGS. 2A, 2B, 3, 4, 7 and 9-10, the sensor 900 can employ through-hole attachment points, 901 and 902, which enables an electrical connection of sensor leads for fluid-leak detection and fluid-level detection via the use of capacitive-measurement technology present on-board. A type of a capacitive-measurement technology can include but not be limited to the capacitive sensors shown and described in U.S. Pat. No. 5,856,783 to Gibb, which is incorporated by reference in its' entirety. The sensor 900 can be mounted to the inside of a container 920 that can receive water/fluid that is being pumped into the container 920 by a water pump 930 having an inlet 932 and outlet 934.

Fluid-leak and fluid-level sensor data can then be monitored remotely via the wireless link. As an example, the fluid-level sensor data could be used as the feedback element for a liquid-dispensing electro-mechanical device such as a water pump 930. The state of the water pump 930, being on or off, can be determined by the level of the fluid inside the container 920 being dispensed into which is being reported by the fluid-level sensor 900 via a wireless link to a controlling printed circuit board (PCB) 950 which is electrically connected to the water pump 930.

Remote monitoring can be done by a desktop computer, or by a remote mobile device, such as but not limited to a laptop computer, a tablet and a smartphone.

The sensor 900 can be used to also turn off the water pump 930 when no water/fluid is being pumped into the container 920.

Figure 12:
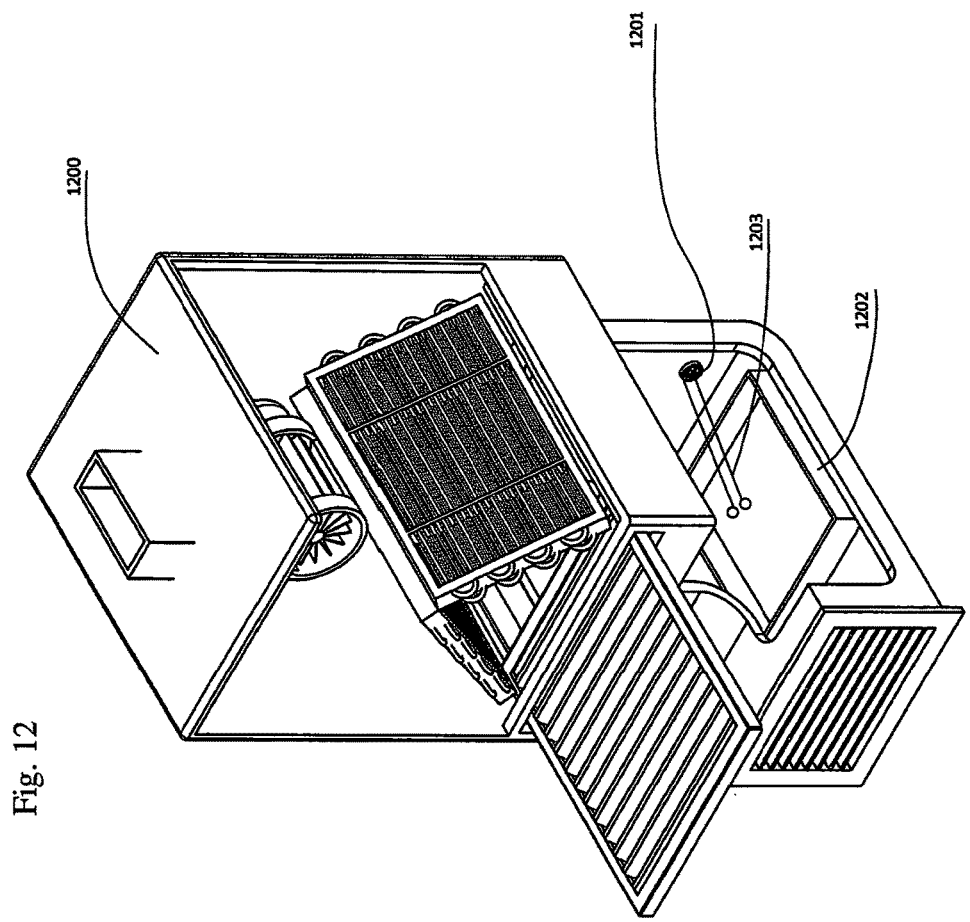
FIG. 12 is a perspective view of an HVAC (heating, ventilation and air conditioning) system using the fluid-leak detection sensor of FIGS. 9-10.

FIG. 12 is a perspective view of an HVAC (heating, ventilation and air conditioning) system 1100 using the fluid-leak detection sensor 900/1101 of FIGS. 9-10.

Referring to FIGS. 2-4, 7 and 9-12, the fluid-leak detection functionality of the sensor 900//1000/1101 can be used to monitor a common commercial HVAC (Heating, ventilation and air conditioning) system 1100. The capacitive measurement probes 1103 placed within the drip pan 1102 of the HVAC system 1100 and connected to the fluid-leak sensor 1101 can alert a remote mobile device via a wireless link of the leak, at which point an on-site, service technician would be dispatched to service the malfunctioning HVAC unit 1100.

Similarly, remote monitoring can be done by a desktop computer, or by a remote mobile device, such as but not limited to a laptop computer, a tablet and a smartphone.

Figure 11:
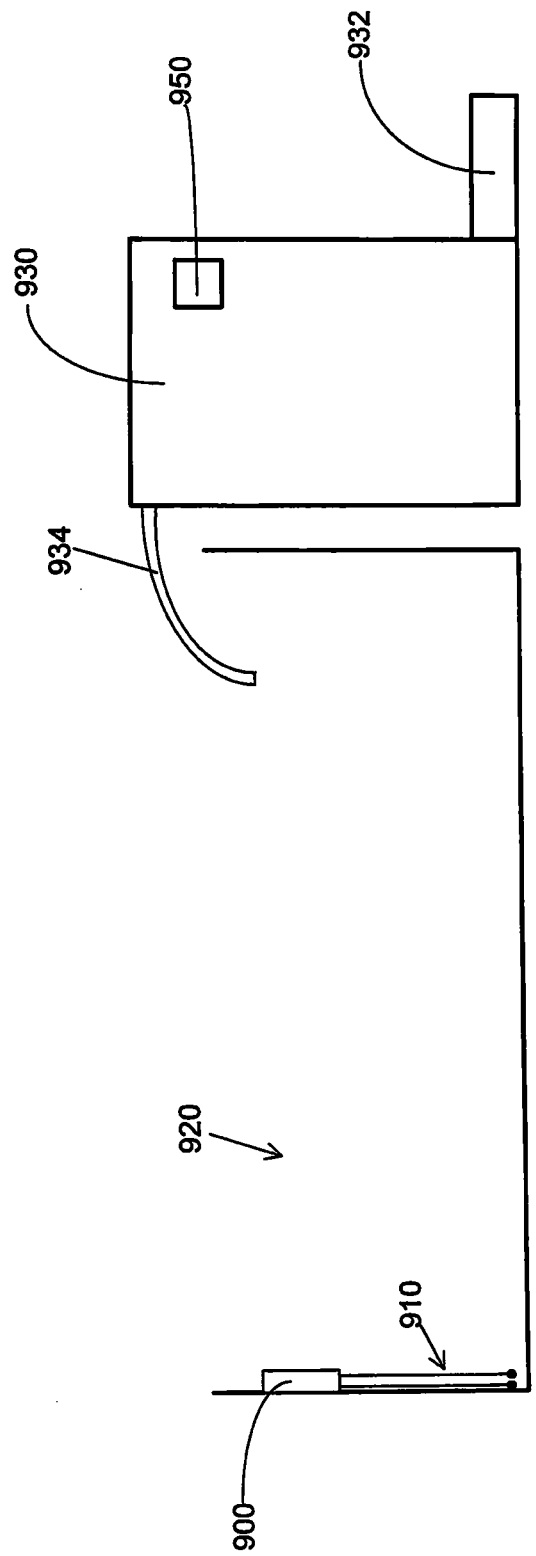
FIG. 11 shows the fluid-leak sensor of FIGS. 9-10 being used with a water pump application.

Referring to FIGS. 9-11, the sensor 900/1000/1101 utilizes the connected battery power source 1002 to electrically tune the on-board Bluetooth, UHF/VHF antenna 1001 by employing a cavity-backed antenna configuration.

An electrically-tuned antenna offers improved radio-frequency performance characteristics such as antenna efficiency, increasing the viable range of an established wireless link with a remote device. Improved antenna efficiency decreases the power consumption of the sensor unit, further increasing the operation time of the sensor when energized from the connected battery power source.

Similar to the previous embodiments, the sensor 900/1000/1101 can include other types of sensors, such as sensors to measure humidity, temperature, indoor/outdoor, measurements, location, and the like.

Similar to the previously embodiments, the sensor 900/1000/1101 can include an IR receiver 170 that can be sent a special code to wipe out the unit's maximum/minimum sensor readings across multiple sensors simultaneously with involving the lower power radio units. This allows for selective wiping of sensors without effecting others if the end user so desires.

The sensor 900/1000/1101 can also be part of a climate monitor assembly. A main functionality of the climate monitor assembly can be to provide a separate sensor platform that can be mounted elsewhere within the same HVAC system further enhancing the monitoring capabilities of the HVAC monitoring system.

Similar to the previous embodiment, the climate monitor assembly can be equipped with a suite of on-board sensors for monitoring various ambient parameters, including: a humidity/temperature sensor, an UV light sensor, an ambient light sensor, and a barometric pressure sensor. A measurement sensor to measure vibrations, and other sensors, such as those referenced in the previous embodiment can also be included, with different arrangements of a plurality of the sensors as needed.

The climate monitor assembly can also include a micro-USB connector for interfacing with optional expansion cards/probes such as the water leak detection probe 1203. The water leak detection probe 1203 can be installed within the water drip pan 1202.

The climate monitor assembly can be enclosed in a portable housing having vent holes/apertures which can be sealed against moisture, and allow for vapor to pass therethrough to provide accurate humidity readings and measurements.

The vent holes/apertures on the mechanical enclosure, which can be equipped with a GORE-TEX membrane, which allows for air to flow across the on-board humidity/temperature sensor yielding improved sensitivity to changes in ambient humidity and temperature.

As previously described, using capacitive sensing technology, the leak detection probe 1203 can measure the water level within the drip pan, allowing for the user to be notified of potential leaks within the HVAC system. The climate monitor assembly can be controlled via the on-board MCU which is equipped with a built-in BLE radio. All collected atmospheric data from the on-board sensors, in addition to any interfaced expansion card/probe connected to the micro-USB port, is sent wirelessly to the central router hub assembly via the BLE radio link. The MCU and all aforementioned on-board sensors are optimized for low power consumption, allowing for the climate monitor assembly to operate continuously for extended periods of time on a single coin cell battery.

The central router hub assembly can serve as the transparent bridge between the air filter monitor and climate monitor assemblies residing on the BLE radio link and the cloud service residing on the internet. It is equipped with two on-board MCUs. The master MCU is equipped with a built-in BLE radio, which allows it to identify all air filter monitor(s) and climate filter monitor(s) within its proximity, and collect data from said units. This data is then sent to the secondary, on-board MCU which is equipped with either a cellular or Wi-Fi radio. A connection is then made to the remote cloud service using either a cellular subscription or Wi-Fi access point as the transport layer. To increase the robustness of the RF link, the central router hub assembly comes equipped with a dual-band whip antenna, providing sufficient RF performance in both the cellular RF band (cellular subscription transport layer) and approximately 2.4 GHz ISM band (Wi-Fi transport layer).

The term approximately can be +/−10% of the amount referenced. Additionally, preferred amounts and ranges can include the amounts and ranges referenced without the prefix of approximately.

It should also be noted that various changes and modifications to the presently preferred embodiments described herein will be apparent to those skilled in the art. Such changes and modifications may be made without departing from the spirit and scope of the present invention and without diminishing its attendant advantages.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A system for monitoring fluid, comprising:
   a portable housing for being attached to a container to be monitored;
   a sensor in the portable housing for monitoring fluid in the container;
   a transmitter on the portable housing for providing wireless transmissions to a remote location, based on data collected from the sensor;
   a battery power source in the portable housing for supplying power to the sensor and the transmitter; and
   a receiver in the portable housing for receiving selected code for erasing local data from the at least one sensor, wherein the receiver includes:
   an IR (infra-red) receiver in the portable housing.

2. The system of claim 1, wherein the sensor includes a capacitance-measurement sensor.

3. The system of claim 2, wherein the capacitance-measurement sensor includes a pair of capacitance measurement probes.

4. The system of claim 1, wherein the portable housing further includes:
   a wireless transmitter for transmitting data from the sensor to a remote receiver.

5. The system of claim 4, wherein the transmitter includes:
   an onboard Bluetooth antenna.

6. The system of claim 1, wherein the system further comprises:
   a mount for mounting the portable housing adjacent to a water pump, so that the sensor is used for monitoring fluid from the water pump in the container.

7. The system of claim 1, wherein the system further comprises:
   a mount for mounting the portable housing adjacent to an HVAC (heating, ventilation and air conditioning) system so that fluid output in the container under the HVAC system is being monitored, the container being a condensation drip pan under the HVAC system.

8. The system of claim 7, wherein the sensor further comprises:
   capacitance measurement probes inside of the condensation pan under the HVAC system.

9. The system of claim 8, wherein the system includes:
   a wireless transmitter adjacent to the portable housing for transmitting data from the sensor to a remote receiver.

10. The system of claim 9, wherein the remote receiver includes:
    a remote mobile device.

11. The system of claim 10, wherein the remote mobile device provides an alert for servicing the HVAC system.

12. The system of claim 1, wherein the portable housing includes:
    at least one mounting hole for allowing at least one fastener to mount the portable housing to another structure.

13. The system of claim 1, wherein the at least one sensor further comprises:
    a plurality of at least one additional ambient sensor selected from a humidity and temperature sensor, a UV light sensor, ambient light sensor and a barometric pressure sensor.

14. The system of claim 13, wherein the system includes:
    a receiver in the portable housing for receiving selected code for erasing local data from a plurality of the sensors without effecting other sensors from the plurality of the sensors.

15. The system of claim 13, wherein the portable housing includes:
    vent holes having membranes for sealing against moisture, and allow for vapor to pass therethrough to provide accurate humidity readings and measurements.

16. A system for monitoring fluid, comprising:
    a portable housing for being attached to a container to be monitored;
    a sensor in the portable housing for monitoring fluid in the container;
    a transmitter on the portable housing for providing wireless transmissions to a remote location, based on data collected from the sensor;
    a battery power source in the portable housing for supplying power to the sensor and the transmitter; and
    a receiver in the portable housing for receiving selected code to wipe out maximum and minimum sensor readings from the at least one sensor in the portable housing.

* * * * *